United States Patent
Caruso et al.

(10) Patent No.: US 7,457,776 B1
(45) Date of Patent: Nov. 25, 2008

(54) SYSTEMS AND METHODS FOR PROVIDING A COMBINATION FINANCIAL PRODUCT

(75) Inventors: Amy Caruso, Southwick, MA (US); James C. Todd, Collinsville, CT (US); Matthew R. Naughton, Simsbury, CT (US); Judith A. Zaiken, East Longmeadow, MA (US); Richard J. Byrne, Windsor, CT (US)

(73) Assignee: Massachusettts Mutual Life Insurance Company, Springfield, MA (US)

( * ) Notice: Subject to any disclaimer, the term of this patent is extended or adjusted under 35 U.S.C. 154(b) by 110 days.

(21) Appl. No.: 11/297,030

(22) Filed: Dec. 7, 2005

(51) Int. Cl.
*G06Q 40/00* (2006.01)
(52) U.S. Cl. ................................. 705/36 R; 705/35
(58) Field of Classification Search ............ 705/35, 705/36 R
See application file for complete search history.

(56) References Cited

U.S. PATENT DOCUMENTS

2004/0172350 A1* 9/2004 Atkinson et al. .............. 705/35

OTHER PUBLICATIONS

"Prudential Annuities First to Offer New Generation of Guaranteed Protection Optional Benefits; Launch of Lifetime Five Living Benefit and Highest Daily Value Death Benefit Fills Gaps in Missing Protection for Retirement Planning". Business Wire. New York: Mar. 14, 2005, p. 1.*
Lubanko, Matthew. "Sweeter Deals on Annuities Guarantee of Lifetime Income Has Pros and Cons". Courant Staff Writer. Hartford Courant. Hartford, Conn.: Sep. 25, 1999. D.1.*
"Equity Indexed Annuities Serve As Safety Net for Today's Investors". PR Newswire. New York: May 26, 2005. p.1.*

* cited by examiner

*Primary Examiner*—Lalita M Hamilton
(74) *Attorney, Agent, or Firm*—Mintz, Levin, Cohn, Ferris, Glovsky & Popeo P.C.

(57) ABSTRACT

The present invention relates to systems and methods for administering combination annuity products and to combination annuity products themselves. Certain embodiments of the invention can be used in connection with variable universal life insurance and variable life insurance contracts.

2 Claims, 2 Drawing Sheets

SYSTEMS AND METHODS FOR PROVIDING A COMBINATION FINANCIAL PRODUCT

BACKGROUND OF THE INVENTION

The present invention relates to combination financial products, systems and methods, e.g., combination annuity products for retirement income planning and investing.

An annuity contract in its simplest form is a contract between an insurance company and a contract owner that provides for payments to an annuitant at regular intervals during the life of a specified individual.

There are different ways of classifying insurance products such as annuities. In one method, insurance products can be classified according to how premium payments are invested. According to this method, insurance products can be divided into two general categories: general account products ("fixed insurance products"), and separate account products ("variable insurance products").

In the case of fixed insurance products, the insurance company guarantees certain benefits. More specifically with respect to fixed deferred annuities, the insurance company generally guarantees a certain rate of interest for a period of time on premiums paid. Once the guarantee period is over, a new interest rate is set for the next period. During an income phase (the period during which the insurance company provides income payments to the contract's annuitant), the contract guarantees fixed income payments to the annuitant based on the contract's account value at the start of the income phase and an assumed interest rate.

Fixed annuities sales are currently driven by growth in Equity Index Annuities (EIAs.) An EIA is an annuity that earns interest that is somewhat linked to a stock or other equity index. An EIA is different from other fixed annuities because of the way it credits interest to the annuity's value. Most fixed annuities only credit interest calculated at a rate set by the company managing the annuity. Equity-indexed annuities credit interest using a formula based on changes in the index to which the annuity is linked. Typically, the EIA does not actually invest in the index.

The current low interest rate environment combined with the volatility of the equity markets has reduced consumer demand for traditional fixed annuities as compared to EIAs, which are marketed as providing "upside potential with downside protection."

If prospective contract or policy owners desire the potential for greater benefits and can accept the associated greater risk than afforded by the conservative investing inherent in fixed insurance products, they may purchase a variable annuity contract. In the case of variable insurance products, the insurance company generally does not guarantee the product's benefits, nor its account or cash values. Instead, the investment performance of the assets underlying the product largely if not entirely determine the benefits and contract values. With variable insurance products the insurance company makes available to the owner a number of investment options in a separate account, sometimes called the variable account. One can refer to the investment options as sub-accounts. The contract owner or policy owner chooses from among these sub-accounts to invest the premiums.

Despite these fixed products and variable products, a need remains for a financial product that can truly provide downside protection and upside potential.

SUMMARY OF THE INVENTION

The present invention relates to combination financial products, systems and methods, e.g., combination annuity products for retirement income planning and investing. An aspect of the invention provides a method for administering a combination annuity product. The method includes: receiving at least one premium payment associated with a combination annuity product; allocating a specified portion of the payment to a fixed account and allocating a specified portion of the payment to a variable sub-account to determine a fixed account/variable sub-account allocation; and guaranteeing principal protection for a specified portion of principal associated with the combination annuity product. The method guarantees principal protection for a specified portion of principal associated with the combination annuity product by: guaranteeing a minimum rate on the fixed account allocation; guaranteeing at the end of a given period that the variable sub-account will not be less than a specific percentage of the original amount allocated to it; and determining the fixed account/variable sub-account allocation based on a specified sub-account protection percentage, a specified fixed account growth rate and a specified benefit period.

Another aspect of the invention provides a combination annuity product produced by a process including: receiving at least one premium payment associated with a combination annuity product; allocating a specified portion of the payment to a fixed account and allocating a specified portion of the payment to a variable sub-account to determine a fixed account/variable sub-account allocation; and guaranteeing principal protection for a specified portion of principal associated with the combination annuity product. The process guarantees principal protection for a specified portion of principal associated with the combination annuity product by: guaranteeing a minimum rate on the fixed account allocation; guaranteeing at the end of a given period that the variable sub-account will not be less than a specific percentage of the original amount allocated to it; and determining the fixed account/variable sub-account allocation based on a specified sub-account protection percentage, a specified fixed account growth rate and a specified benefit period.

Yet another aspect of the invention provides a system for administering a combination annuity product. The system includes: receiving means for receiving data indicating payment of at least one premium payment associated with a combination annuity product; allocating means in communication with the receiving means, the allocating means for allocating a specified portion of the payment to a fixed account and allocating a specified portion of the payment to a sub-account to determine a fixed account/variable sub-account allocation; and guaranteeing means in communication with the allocation means. The guaranteeing means guarantees principal protection for a specified portion of principal associated with the combination annuity product by: guaranteeing a minimum rate on the fixed account allocation; guaranteeing at the end of a given period that the variable sub-account will not be less than a specific percentage of the original amount allocated to it; and determining the fixed account/variable sub-account allocation based on a specified sub-account protection percentage, a specified fixed account growth rate and a specified benefit period.

BRIEF DESCRIPTION OF THE ILLUSTRATED EMBODIMENTS

DETAILED DESCRIPTION OF THE INVENTION

Figure 1:
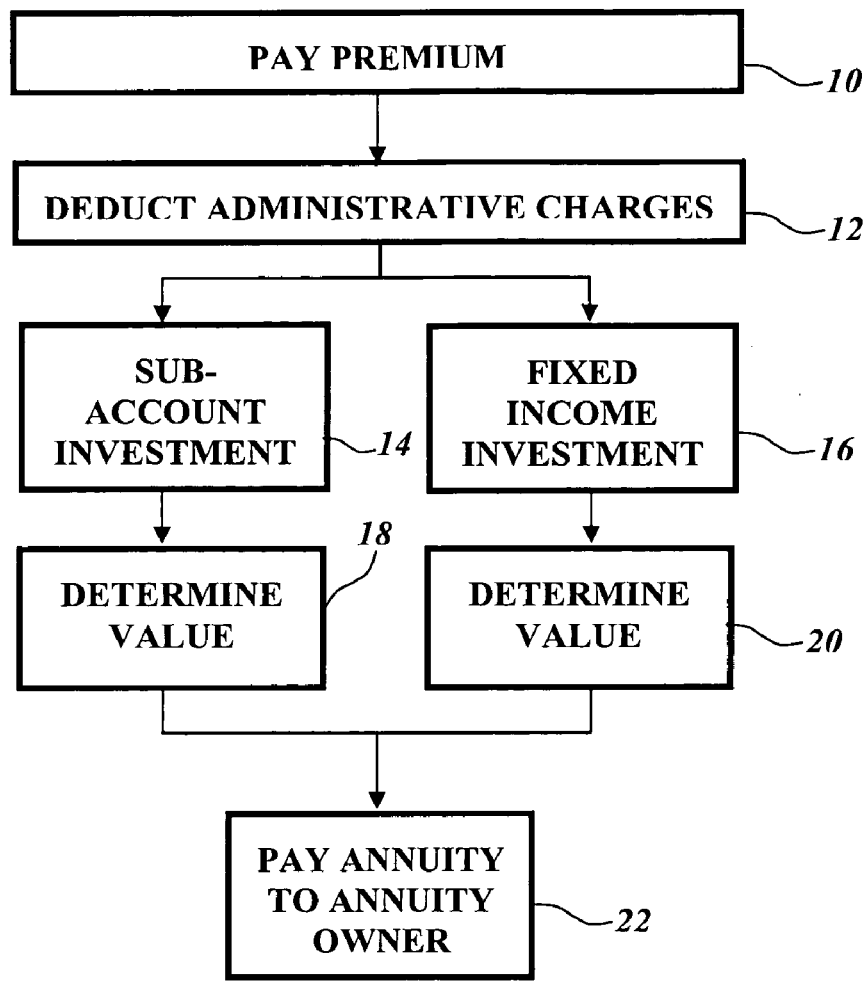
FIG. 1 is a flowchart of a method according to the invention.

The present invention relates to combination financial products, systems and methods, e.g., combination annuity products for retirement income planning and investing.

Insurance products, which are classified according to how premium payments are invested and how insurance benefits are determined, can be divided into two general categories: fixed or general account products ("fixed insurance products"), and variable or separate account products ("variable insurance products"). In addition, one can produce a hybrid product that combines both fixed and variable elements ("combination insurance products").

An embodiment of the invention provides a fixed/variable combination product. It provides a hybrid product that combines both a fixed account and a variable sub-account. By example, the product is a registered product, has a market value adjustment (MVA) on the fixed investments, and varying choices of principal protection on the equity investments.

With regard to MVA, often an insurance company adopts an investment strategy that is geared towards the maturity date of a policy, meaning that the company is able to invest in assets with longer maturity periods, and thus match the maturity period of the underlying investment with the liability structure of the particular policy, i.e., the policy maturity period. Therefore, early withdrawals may cause an asset-liability mis-match, which can be addressed through the use of a Market Value Adjustment. Therefore, if a withdrawal is made outside of a Window Period, the amount of the withdrawal from the Fixed Account will be adjusted in accordance with the then current interest rate environment. For example, if prevailing market interest rates are higher than the rate guaranteed for the fixed account, the market value adjustment would be negative; conversely, if the prevailing market interest rates are lower than the rate guaranteed for the fixed account, the market value adjustment would be positive.

However, any negative adjustment is limited to the extent that the Fixed Account Value cannot be less than the Fixed Account Value that would result from the Guaranteed Interest Rate as specified in the Contract Schedule. The MVA formula is outlined later in this document.

Products according to the invention appeal to those who wish to combine the security of a fixed annuity with actual market participation for a specified minimum time period. The product allows some participation in the market via a variable sub-account. An aspect of the product offers varying time horizons with a respective fixed account and this variable sub-account. According to an embodiment, the product offers the option to designate as the sub-account one of a variety of specified private label funds. Product enhancements can include:

adding other investment options the client may provide allocation options to the fixed account and investment options and the financial product administration system determines the principal protection amount.

FIG. 1 is a block flow diagram illustrating steps involved in an annuity product in accordance with one embodiment of the invention. Annuity premiums are paid at step 10. Certain administrative charges may be deducted before investment of the balance of the premium at step 12. The balance of the premium is allocated between a variable sub-account investment 14 and a fixed income investment 16.

Certain embodiments of the product guarantee principal protection for a specified amount of the principal, e.g., 100%, on the contract anniversary date by:

1) guaranteeing a credited/minimum rate on the fixed account allocation;

2) guaranteeing at the end of a given period that the variable sub-account will not be less than a specific percentage of the original amount allocated to it;

3) and then determining the fixed account/variable sub-account allocation with a formula such as the one listed directly below.

For a given Separate Account Protection Percentage x and a given Fixed Account Growth rate of y and a given Protection Period of z years, the amount that is required to be allocated to the Fixed Account to ensure 100% principal protection is $$\frac{(1-x)}{[(1+y)^z - x]}.$$

This formula determines the allocation to the fixed account, and therefore the subaccount, too. There is a similar formula for states that do not allow for MVA fixed accounts and one can use an annual reset portfolio rate instead to credit the contract and the credited rate the first year and the minimum interest rate in the remaining years of the Benefit Period to determine the allocation to the fixed account and subaccounts. In one embodiment, an administration system according to the invention rounds up the allocation to the fixed account to 2 decimal points.

Thereafter, other charges are deducted daily, weekly, monthly, or yearly, and are typically a percentage of one or more aspects of the contract's variable sub-account value. Those skilled in the art will recognize that other time periods may be employed without departing from the scope of the present invention. The value of the sub-account investment is periodically determined in step 18, typically, every business day that stock markets are open for business. The value of the fixed income investment will also require periodic determination in step 20, and will depend on the interest rate of the fixed income investment of the contract. Such investment will typically steadily increase in value and will not fluctuate as the sub-account investment typically will.

In an embodiment, the interest rate of the fixed income investment will be guaranteed for a specific period. At the end of that period, the contract typically provides that the owner may elect to allow the accrued balance to roll over for the same period at the then current guaranteed interest rate, or select a new guarantee period with its then current interest rate, or reallocate some of the account value to the variable sub-account. The premiums may be paid on a single payment basis. The account values may be adjusted on a daily, weekly, monthly or yearly basis, or some other basis. Upon reaching the income date, periodic income payments 22 are made to the annuity beneficiary based on the account value at that time.

Figure 2:
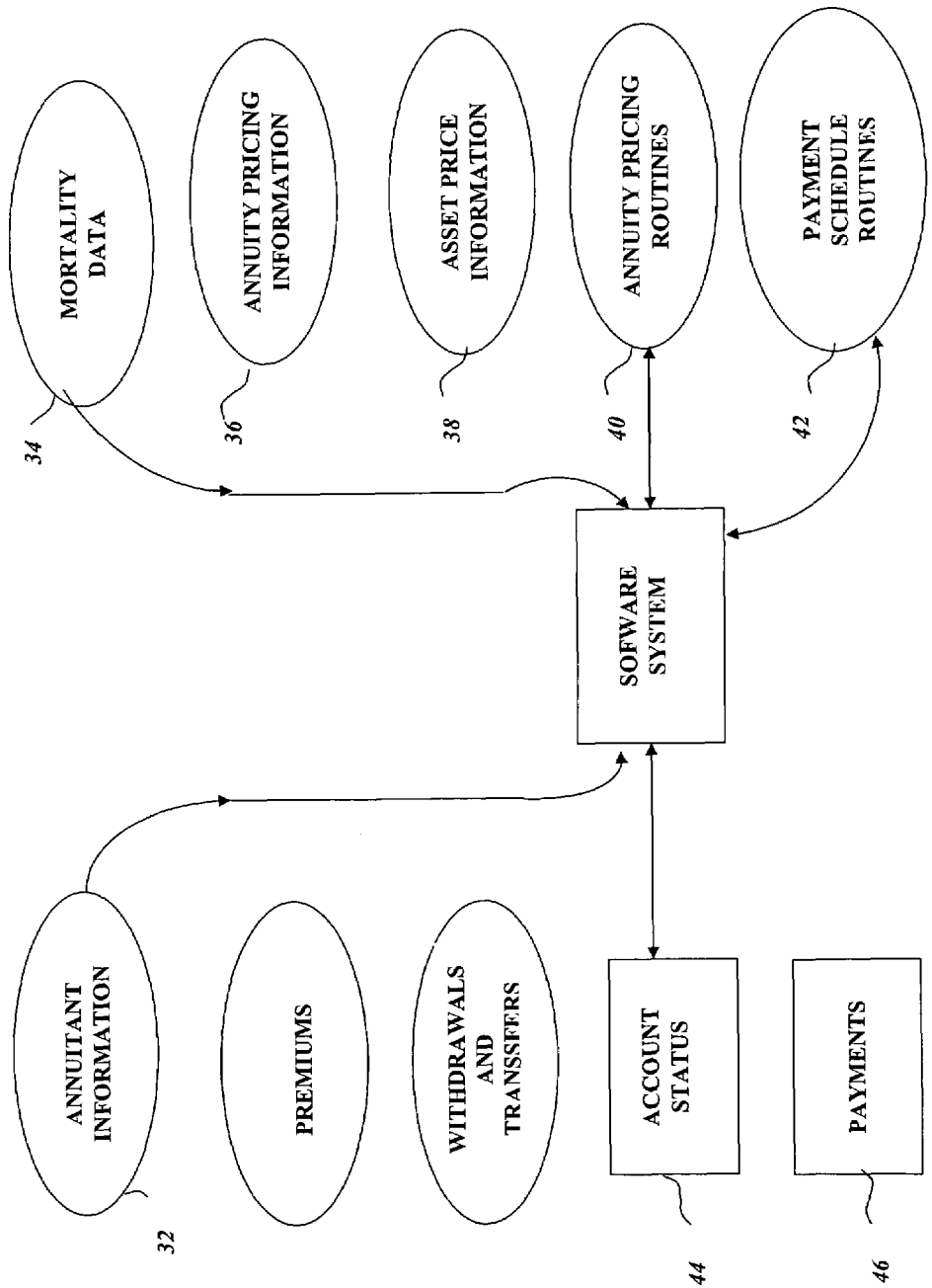
FIG. 2 is a schematic illustration of a system according to the invention.

Referring to FIG. 2, software system 30 is preferably implemented as a main program of a software program that includes various routines or modules to perform the functions of the present invention described herein. Appropriate software structures may be implemented by persons of ordinary skill in the art to implement the present invention. The invention is not limited to the embodiments described herein.

The functions of software system 30 may be implemented in special purpose hardware or in a general or special purpose computer with appropriate operating system and memory storage and input/output devices. In a preferred embodiment the functions of system 30 are controlled by software instructions which direct a computer or other data processing apparatus to receive inputs, perform computations, transmit data internally, transmit outputs and effectuate the receipt and transfer of funds as described herein. An embodiment of the present invention provides a system for managing annuities and distribution of annuity payments.

The system includes: (1) data storage for storing product information related to: (a) annuity pricing information for determining pricing interest rates for said annuities, (b) asset price information for determining actual rates of returns for assets underlying said annuities, (c) mortality data for each annuitant of said annuities; and (2) data processing means for (a) deriving pricing interest rates from said annuity pricing information, (b) determining actual rates of returns for said underlying assets of said annuities from said asset price information, (c) computing actuarial present values and fund reserves from said pricing interest rates and said mortality data, (d) computing investment performance factors from said pricing interest rates and said actual rates of return, (e) computing interest adjustment factors from said actuarial present values, and (f) determining payment progressions for said annuities from said investment performance factors and said interest adjustment factors. Data storage may be provided by any suitable storage medium that is accessible by the data processor used to implement the invention. Examples include, random access memory, magnetic tape, magnetic disk, or optical storage media.

Software system 30 receives annuity contract information 32 regarding new annuity contracts. This information will typically include information about the contract owner (and annuitant, if that person is not the contract owner) that is pertinent to mortality, (e.g., age), the type or types of annuities selected, and the contract owner's investment choices. For example, a combination product according to the invention has a fixed component and a variable component, each with its corresponding periodic income payment options, with each different component supported by different underlying asset classes. Software system 30 also receives transfer requests from existing annuity owners. Annuitant/contract owner information 32 is input into a memory accessible by software system 30, using any suitable input device, e.g. by keyboard entry of data into a database.

Software system 30 also receives product information such as mortality data 34, used in calculation of premiums, and annuity pricing information 36. Annuity pricing information 36 includes fixed income investment information such as market interest rates used to price annuities. These interest rates may be tied to an objective market rate such as treasury rates, a corporate bond rate or other objective rate. The rates used to price annuities may be related to an objective market interest rate by a constant offset, a multiplicative factor, an exponential function, or any other suitable relationship. Software system 30 also receives asset price information 38 which comprises the net asset values of the underlying assets for each variable sub-account. Asset price information 38 is used by system 30 to determine the investment performance of the assets underlying the annuity funds.

Software system 30 uses annuity pricing information 36 and mortality data 34 to determine the market value of annuities based on such information using annuity pricing routines 40. Software system 30 also uses the information to develop both projected, and actual annuity payment schedules using payment schedule routines 42. Software system 30 manages the calculation of an annuity owner's account status 44 and payments 46. In an embodiment, the pricing routines, payment schedules, and methods for determining account status and payments are conventional and known to those of ordinary skill in the art.

Clients may invest a portion of their initial premium in the variable sub-account and choose different levels of principal protection for specific time horizons. In an embodiment, if a client withdraws funds in excess of the free-out amount (e.g., 10%), there is a surrender charge and the level of principal protection is adjusted for withdrawals pro-rata. Annually, the client may take up to the free-out amount (e.g., 10%) of the premiums paid in the first year or of the contract value as of the contract anniversary date without a contingent deferred sales charge (CDSC)—one can refer to the amount that can be take out of the account without charge as the "free-out amount." In an embodiment, there will be an MVA—either negative or positive. The client will still have to pay any applicable taxes.

At least one embodiment of the invention fits the needs of the investor with a desire to grow assets with only minimal risk of loss. An annuity according to an embodiment of the present invention offers a straightforward investment that provides:

Principal protection;

True market participation;

Transparent details in contract, marketing materials, and prospectus; and

Disclosure and regulatory oversight of a variable annuity

In an embodiment of the invention, the product is suitable for both non-qualified and qualified markets, including simplified employee pension (SEP), Roth individual retirement account (IRA), Custodial IRA, and IRA rollovers, and stretch versions of all the previously-mentioned product types. Stretch IRAs are accounts that one can set up to defer taxes, not just in the lifetime of the individual who set up the IRA, but through multiple generations.

An embodiment of the system that administers a product according to the invention allows 90-24 rollovers and 1035 exchanges. Revenue Procedure 90-24 allows a tax-free exchange of one tax-sheltered annuity contract (or custodial account) for another. 1035 refers to a provision in the tax code, which allows for the direct transfer of accumulated funds in a life insurance policy, endowment policy, annuity policy to another life insurance policy, endowment policy or annuity contract without creating a taxable event.

According to an embodiment, the combination product is a single premium product. In an embodiment, the issue ages are limited to a specified age, e.g., 90 in all states except Oklahoma, where it is limited to age 85. In an embodiment, the maximum maturity age is limited to a specified age, e.g., 100 for all states except Oklahoma, where it is 95. In an embodiment, the free look period corresponds to each state's filing requirements. Variations on all of the parameters discussed above are within the scope of the invention. For example, in alternate embodiments the issue age could be different than 90 and the free look period could be longer than that required by state law. In an embodiment, there is a minimum deposit for qualified and non-qualified contracts. e.g., $25,000.

In an embodiment, there is a maximum premium without Home Office Approval, e.g., $1,500,000 up to age 75 and $500,000 over age 75. In alternate embodiments the maximum premium can be higher or lower than the amounts just noted and the age(s) for transition of the maximum premium, to the extent one exists, can be higher or lower than just noted. In this embodiment, the combination product is a single premium product.

Death Benefits

In an embodiment, the standard (and only) death benefit is the greater of contract value or return of premium, adjusted for withdrawals and partial annuitizations. After a specified age, e.g., age 80, the death benefit is the contract value.

In an embodiment, the contract owner has all the rights of the contract. He or she can make all the changes, not the annuitant.

Number of Lives (Joint Ownership)

In an embodiment, the contract can be owned by joint contract owners, including non-spouses.

Partial Surrender/Partial Withdrawals

In an embodiment, partial surrenders are allowed. However, in order to maintain a higher average balance within the block of business, in an embodiment the account balance can never go below a specified amount, e.g., $10,000, as a result of a partial surrender. If the account balance goes below the specified amount due to a partial surrender, the entire account is surrendered at the contract withdrawal value. Indeed, in an embodiment, the system will not allow the partial surrender to occur and the agent (or client—depending on who submitted the request) will be contacted before the administration system initiates the full surrender.

In an embodiment, the administration system allows systematic withdrawal plans (SWPs) and Required Minimum Distributions to decrease the account below the specified minimum amount.

In an embodiment, partial surrenders and partial withdrawals are deducted pro-rata from the MVA account and the variable sub-account. The administration system can incorporate a minimum partial surrender amount, e.g., $250.

Annuitization

An embodiment of the combination product offers both fixed and variable annuitization options after a specified period, e.g., the $13^{th}$ month, of the contract, to provide consistency for the contracts and simplicity to the producers. In an embodiment, the income options include:

Life Income—Periodic payments are made as long as the Annuitant lives.

Life Income with Period Certain—Periodic payments are made for a guaranteed period, or as long as the Annuitant lives, whichever is longer. According to an embodiment, the guaranteed period may be selected from a variety of periods, e.g., five (5), ten (10), or twenty (20) years. If the Beneficiary does not desire payments to continue for the remainder of the guaranteed period, he/she may elect to have the present value of the guaranteed annuity payments remaining commuted and paid in a lump sum.

Joint and Last Survivor Annuity—Periodic payments are made during the joint lifetime of two Annuitants continuing in the same amount during the lifetime of the surviving Annuitant.

Joint and ⅔ Survivor Annuity—Periodic payments will be made during the joint lifetime of two Annuitants. Payments will continue during the lifetime of the surviving Annuitant and will be computed on the basis of two-thirds of the annuity payment (or Units) in effect during the joint lifetime.

Joint and Last Survivor with Period Certain

Periodic payments will be made for a guaranteed period, or during the joint lifetime of two Annuitants continuing in the same amount during the lifetime of the surviving Annuitant, whichever is longer. The guaranteed period may be five (5), ten (10) or twenty (20) years. If the Contract Owner does not desire payments to continue for the remainder of the guaranteed period, he/she may elect to have the present value of the guaranteed Annuity Payments remaining commuted and paid in a lump sum. The Company may assess any applicable Contingent Deferred Sales Charge from the resulting commuted value prior to payment of the lump sum. Such election cannot be made earlier than one year after the first Annuity Payment has commenced.

Period Certain Annuity—Periodic payments will be made for a specified period. In an embodiment, the specified period must be at least five (5) years and cannot be more than thirty (30) years. If the Contract Owner does not desire payments to continue for the remainder of the guarantee period, he/she may elect to have the present value of the remaining payments commuted and paid in a lump sum or as Annuity Option purchased at the date of such election.

In an embodiment, the administration system waives surrender penalties when annuitizing the contract if a life or period certain option of more than a specified period, e.g., 10 years, is chosen. If a client annuitizes and then commutes the contract, the value of the account will compensate for the surrender charges not applied. In an embodiment, a client may only commute after a specified date, e.g., 12 months, from the annuitization date.

In an embodiment, partial annuitizations are allowed with a minimum amount, e.g., $10,000 for the partial annuitization.

Fixed Accounts

In an embodiment, the combination product offers a variety of periods, e.g., 5 to 20 year periods, for the fixed account. As noted above, in an embodiment, the fixed account includes a Market Value Adjustment (MVA), where applicable. In another embodiment the fixed account does not include a MVA.

In an embodiment, the client can not allocate more than a specified amount, e.g., 90%, of the initial premium to the fixed account. According to an embodiment, the administration system will require a minimum allocation, either as a percentage of the premium or as an absolute value, to the fixed account in order to ensure that the client does not allocate all of the assets to the variable sub-account.

As noted above the administration system uses a Market Value Adjustment (MVA) in order to adjust for differences in the credited rate environment. The administration system compares the difference between the initial rate and the current rate to calculate the MVA. Note that the MVA can benefit the consumer if the current rate is lower than the initial rate.

In an embodiment, the administration system allows withdrawals from the fixed account without a surrender charge or MVA during a specified window period, e.g., 30 days, at the end of the guarantee period.

In an embodiment, all surrenders and withdrawals above the free-out amount, unless within the window period or explicitly exempted, are subject to a market value adjustment (MVA). The MVA will be calculated using the following formula:

$$((1+a)^{(n/12)})/((1+b+0.0025)^{(n/12)})-1l$$

a) Index rate for a security with a period to maturity equal to the guarantee period, determined at the beginning of the guarantee period b) Index rate for a security with a period to maturity equal to n months remaining in the current guarantee period, determined on the date of calculation n) Number of months left in the guarantee period Under no circumstances will the fund value reduced by the MVA be less than the fund value computed at the respective state's interest rate guarantee minimum.

If surrenders occur before the end of a guarantee period, an MVA will be assessed based upon the aforementioned formula.

The Variable Sub-Account

In order to directly participate in the stock market, an embodiment of the combination product offers a variable sub-account for a portion of the initial premium. The administration system assesses assets within the sub-account standard fees associated with the sub-account.

In alternative embodiments, the administration system can use a different type of variable sub-account or the administration system can allow the client to select among a variety of variable sub-accounts.

In an embodiment, there is a maximum limit for allocations to the variable (or other sub-account). As indicated above, at issue the administration system does not allow 100% of the client's premium to be invested into the sub-account due to the nature of the product's value proposition of principal protection.

Principal Protection

In an embodiment, the administration system offers principal protection for all time horizons. The product concept is to protect a specified amount, e.g., 100%, of the initial premium from the MVA fixed account and the variable sub-account. In an embodiment, the administration system automatically allocates respective portions of the premium to the MVA fixed account and to the variable sub-account.

In an embodiment, the principal protection is only available on the benefit expiration date associated with the time horizon. For example, if a client chooses the 5 year period, the client is able to access the contract value or the principal protection value, whichever is greater, on the $5^{th}$ benefit expiration date. In an embodiment, the administration system provides notice of the window period to the client and producer prior to the window period.

The administration system adjusts the principal protection by withdrawals and partial annuitizations.

Rebalancing/Transfers

In an embodiment, at the time of a client's benefit expiration date, the administration system initiates automatic rebalancing of the client's account to coincide with the level of principal protection requested at issue.

However, in an embodiment, the client has the option to direct allocations or initiate transfers between the fixed and variable sub-account assets during the window periods based on options available at that time. As noted above, in an embodiment, the administration system notifies the client and the producer of the window period prior to the window period.

In an embodiment, the client is not allowed to make transfers at any time except during the window periods. Transfers can be executed via Internet, VRU, mail, or by calling a Service Center.

Window Period

In an embodiment, the product has a Window period, e.g., 30 days prior to the contract anniversary date. During this time period, the client can surrender the contract on the benefit expiration period after the principal protection benefit adjustment has been made, the client can notify the company to rebalance to any level of principal protection available at the time of renewal on the benefit expiration date, the client can take a withdrawal, or the client can annuitize.

In an embodiment, the administration system provides notice to the client, prior to the window period, reminding the client of the actions the client may take on the contract anniversary date.

Product Charges and Fees

A. Sales Charge

In an embodiment, the administration system can provide an upfront sales charge option. For contracts that have the upfront sales charge, the mortality and expense charge will be less than contracts that do not have the upfront sales charge and there will not be contingent deferred sales charges.

B. Mortality and Expense (M&E) Charge

In an embodiment, the mortality and expense charge is a daily charge based on the value of the variable sub-account value. In an embodiment, the client is charged a different M&E charge, based on upfront charges or benefit period. The mortality risk associated with the insurance benefits provided, including our obligation to make annuity payments after the annuity date regardless of how long all annuitants live, the death benefits, and the guarantee of rates used to determine annuity payments during the income phase; and the expense risk that will be sufficient to cover the actual cost of administering the contract including our provision of the Principal Protection Benefit and special withdrawal features.

C. Premium Tax

Some embodiments of the product include a premium tax which varies by state of contract issue. Alternate embodiments do not include a premium tax.

D. Administrative/Maintenance Fee

In an embodiment, there is an annual administrative fee, e.g., $40.

E. Surrender Charges (Contingent Deferred Sales Charges—CDSC)

In an embodiment, surrender charges are on a specified schedule, e.g., a specified period of years, beginning at a specified percentage.

F. Subaccount Fee

In an embodiment, the administration system assesses assets within the variable sub-account the standard fees associated with the sub-account on a daily basis.

Minimum Guaranteed Interest Rate

In an embodiment, the product offers a minimum guarantee on the fixed account for the MVA assets. During the filing process, the product uses the most flexible approach to accommodate future interest rate environments.

It is possible to have a fixed account without an MVA. This will be a portfolio rate-type account and will be required in a few states that will not approve an MVA fixed account. In this case, the credited rate will be guaranteed for one year and the rate will be renewed annually on the contract anniversary date. Similarly to the formula mentioned previously, the allocation to the fixed account and subaccounts will be based on the first year credited rate and the guaranteed minimum interest rate thereafter. In an embodiment the guaranteed minimum interest rate is 2% for the first 10 years and 3% thereafter. This may be state specific as well.

Free Withdrawals

In an embodiment, a client can withdraw a specified amount, e.g., 10% annually, of the contract value without a surrender charge. The administration system assesses a surrender charge for any partial withdrawal more than the free out amount or for a full surrender, unless it is a required minimum distribution. The administration system allows Required Minimum Distributions without penalty.

In an embodiment, in the first year, the free out amount is based on the purchase payment.

In years two and after, the administration system determines free withdrawals on the anniversary date of the contract and updates/adjusts for subsequent withdrawals. For example, if the client takes out half of the allowed free-out at the beginning of the second year, the client will be able to take up to the remaining balance of the free-out throughout the year as long as the withdrawals meet the minimum partial surrender amounts and the account value does not go below the minimum account value.

In an embodiment, the free-out amount allowed is not cumulative from one year to the next.

The administration system withdraws the free-out amount requested by the client pro-rata from the MVA account and the variable sub-account, and adjusts the Principal Protection accordingly.

Automatic Withdrawals/Interest Sweep

In an embodiment, the product offers a SWP, but not an interest sweep. In this context, an interest sweep is a periodic transfer of interest from the fixed account to the variable sub-account. SWPs and Required Minimum Distributions are allowed to decrease the account below the specified minimum amount, e.g., $10,000.

Spousal Continuation

In an embodiment, if the contract owner (or annuitant if entity-owned) dies before the annuitization period, the spouse may continue the contract even if not listed as the joint owner. In an embodiment, the surviving spouse can only exercise the right to continue the Contract once while the Contract is in effect. If no election is made within a specified period, e.g., 60 days, of receipt of proof of death, the administration system will consider the surviving spouse to have continued the Contract in his or her own name.

Death Waiver

In an embodiment, the administration system will not impose a surrender charge on death benefit payments.

Nursing Home/Home Health Care Waiver

In an embodiment, the administration system does not apply surrender charges or assess a negative MVA on a distribution in the event that the client is confined to a nursing home or in need of home health care. In order to qualify for this waiver, the client must not have been in a nursing home or utilizing home health care within two years of the contract effective date, and the client must be confined or utilizing services for at least a specified period, e.g., 90 consecutive days, after issue of the contract. The services must be prescribed by a physician and be medically necessary. Once a confirmation is received in good order, all surrender charges/negative MVA will be waived upon full or partial surrenders. The client may access the funds as a lump sum or as partial withdrawals. Upon exit from the nursing home or termination of home health care services, the administration system re-establishes the confinement period, e.g., the 90-day confinement period.

In an embodiment, there are no surrender charges or negative MVA adjustments applied on the terminal illness benefit paid to the participant. A physician must provide documentation that the participant is not expected to live more than 12 months. Once the confirmation is received in good order, all surrender charges are waived upon full or partial payment of the terminal illness benefit, which is the value of the death benefit at the time the administration system receives proof of illness. The annuitant/owner may only use this waiver if the annuitant/owner was first diagnosed with a terminal illness after the effective date of the annuity. In an embodiment, this waiver does not assess an explicit charge.

Commutation

In an embodiment, once the administration system has annuitized the contract (meaning once the client starts receiving annuity payments), the client may commute the value of any remaining guaranteed payments. In an embodiment, the administration system will not assess a surrender charge after the commutation, except in those states that require it.

Alterations, Modifications, and Improvements

Having thus described illustrative embodiments of the invention, various alterations, modifications and improvements are contemplated by the invention. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. A method for administering a combination annuity product, the method comprising:

receiving at least one premium payment associated with a combination annuity product;

allocating a specified portion of the payment to a fixed account and allocating a specified portion of the payment to a variable sub-account to determine a fixed account/variable sub-account allocation; and, guaranteeing principal protection for a specified portion of principal associated with the combination annuity product, wherein said guaranteeing principal protection includes:

guaranteeing a minimum rate on the fixed account allocation;

guaranteeing at the end of a given period that the variable sub-account will not be less than a specific percentage of the original amount allocated to it; and, determining with a computer the fixed account/variable sub-account allocation based on a specified sub-account protection percentage, a specified fixed account growth rate and a specified benefit period, wherein said determining the fixed account/variable sub-account allocation comprises determining the specified portion of the at least one premium payment to allocate to the fixed account according to the equation $$\frac{(1-x)}{[(1+y)^z - x]},$$

wherein x is the specified sub-account protection percentage, y is the specified fixed account growth rate, and z is the specified benefit period.

2. A system for administering a combination annuity product, the system comprising:

receiving means for receiving data indicating payment of at least one premium payment associated with a combination annuity product;

allocating means in communication with the receiving means, the allocating means for allocating a specified portion of the payment to a fixed account and allocating a specified portion of the payment to a sub-account to determine a fixed account/variable sub-account allocation; and, guaranteeing means in communication with the allocating means, the guaranteeing means for guaranteeing principal protection for a specified portion of principal associated with the combination annuity product, wherein said guaranteeing means guarantees said principal protection by:

guaranteeing a minimum rate on the fixed account allocation;

guaranteeing at the end of a given period that the variable sub-account will not be less than a specific percentage of the original amount allocated to it; and, determining the fixed account/variable sub-account allocation based on a specified sub-account protection percentage, a specified fixed account growth rate and a specified benefit period, wherein said guaranteeing means determines the fixed account/variable sub-account allocation by determining the specified portion of the at least one premium payment to allocate to the fixed account according to the equation $$\frac{(1-x)}{[(1+y)^z - x]},$$

wherein x is the specified sub-account protection percentage, y is the specified fixed account growth rate, and z is the specified benefit period.

* * * * *